United States Patent [19]

Matthew

[11] 3,713,609
[45] Jan. 30, 1973

[54] AIRCRAFT ARRESTING GEAR
[75] Inventor: John Campbell Matthew, Lasswade, Scotland
[73] Assignee: Mactaggart, Scott & Company, Limited
[22] Filed: March 2, 1971
[21] Appl. No.: 120,195

[52] U.S. Cl. .............................244/110 A, 188/290
[51] Int. Cl. ................................B64f 1/02
[58] Field of Search .........244/110, 63; 188/292, 290

[56] References Cited

UNITED STATES PATENTS 3,200,906  8/1965   Bernard............................244/110 A
3,352,516  11/1967  Jackson............................244/110 A
3,481,565  12/1969  Marcheron.......................244/110 A

Primary Examiner—Milton Buchler
Assistant Examiner—Paul E. Sauberer
Attorney—Holman & Stern

[57] ABSTRACT

The invention consists in an aircraft arresting gear wherein a rope or net is stretched across a runway and is secured to power absorbing means located at each side of the runway.

Connected to each end of the rope or net is a belt having transverse teeth. Each belt is passed through a casing having inlet and outlet ports. Hydraulic fluid introduced through an inlet port fills the gaps between the teeth as the belt passes through the casing and means are provided by which such fluid is displaced and discharged through the outlet port under pressure. Such means may be in the form of a tooth wheel which meshes with the teeth of the belt. The discharged fluid passes through a valve by which the outlet pressure can be controlled to regulate the retarding force applied to the belt. Such control regulates the retarding force applied to the aircraft being arrested.

12 Claims, 12 Drawing Figures

AIRCRAFT ARRESTING GEAR

This invention has reference to aircraft arresting gear for retarding the motion of aircraft after landing in circumstances when the length of the runway available for bringing the aircraft to rest is limited. The invention relates particularly to that kind of arresting gear which consists of a rope span or net, stretched transversely across the runway, which is engaged by the aircraft or by a hook attached to the aircraft, the rope or ropes attached to the net being led over guide pulleys on each side of the runway and thence to power absorbing means which, when the rope or net is engaged by an aircraft, control the rope or net tension while the aircraft is being arrested.

According to the present invention in an arresting gear of the kind set forth each end of the rope or net is connected to power absorbing means comprising a flexible belt having transversely extending teeth on at least one face thereof, a casing having inlet and outlet ports and through which the belt passes, means provided with teeth which mesh with the gaps between the teeth of the flexible belt and by which hydraulic fluid introduced through the inlet port into the gaps between the teeth of the belt is thereafter pumped through the outlet port and valve means to regulate the back pressure of the pumped fluid and thereby the retarding force of the arresting gear.

Each belt may have transverse teeth on both faces thereof and the casing provided with two inlet ports, two outlet ports and two toothed wheels, one meshing with the teeth on one face of the belt and the other with the teeth on the other face of the belt, the belt and toothed wheels thereby forming two gear pumps with a casing common to both.

The casing may have a series of alternate inlet and outlet ports on one side of the belt, a corresponding series of inlet and outlet ports on the other side of the belt and a toothed wheel between each pair of inlet and outlet ports.

The invention also consists in an arresting gear as set forth in the preceding paragraph but two wherein each end of the rope or net is connected to two superimposed belts having intermeshing teeth on their opposed faces, the superimposed belts being passed through the casing which incorporates guide means by which the belts, during their traverse through the casing, are separated and thereafter forced together, the separating of the belts permitting hydraulic fluid to enter between the belts through the inlet port while the subsequent meshing of the teeth forces the trapped fluid through the outlet port.

The invention further consists in an arresting gear as set forth in any of the four preceding paragraphs in combination with an accumulator connected to the outlet ports and which is charged through a non-return resetting valve when the belt is drawn through the casing by the aircraft being retarded, the said pump functioning as a motor powered by the accumulator when the valve is reset so that the pump will retract the belt.

The teeth of the belts may be protected by the teeth of protective belts meshing therewith, guide means being provided whereby the protective belts are separated from the first mentioned belts when the latter are passing through the casing containing the toothed wheel and further guide means provided to thereafter cause said teeth to again intermesh with the teeth of the first mentioned belts.

In an alternative arrangement each belt connected to the rope or net is a composite belt formed of two belts having teeth on only one face thereof, the two belts being back to back with their teeth outwards when fed to and drawn through the casing so that their teeth mesh with the toothed wheels therein, guide means being provided by which the belts forming each composite belt are separated to form two U-loops after leaving the casing and further guide means by which the teeth of the two belts are thereafter caused to mesh to form the composite belt.

In a further embodiment of the invention each power absorbing means comprises a hydraulic gear type pump casing, pairs of opposed gear wheels located within the casing, two parallel endless belts associated with the casing and arranged back to back, the inner faces of each belt having transversely extending teeth, guide rollers around which the belts are passed, the opposed runs of the belts passing through the casing and between the opposed gear wheels so that their transversely extending teeth mesh with the gaps between the teeth of the pump gear wheels, and a cable sandwiched between the opposed runs of the belts and connected at one of its ends to the adjacent end of the aircraft engaging means, the cable when pulled by the aircraft engaging means driving the endless belts. The outer faces of the endless belts are preferably formed of resilient material.

Reference will now be made to the accompanying drawings wherein.

Figure 1:
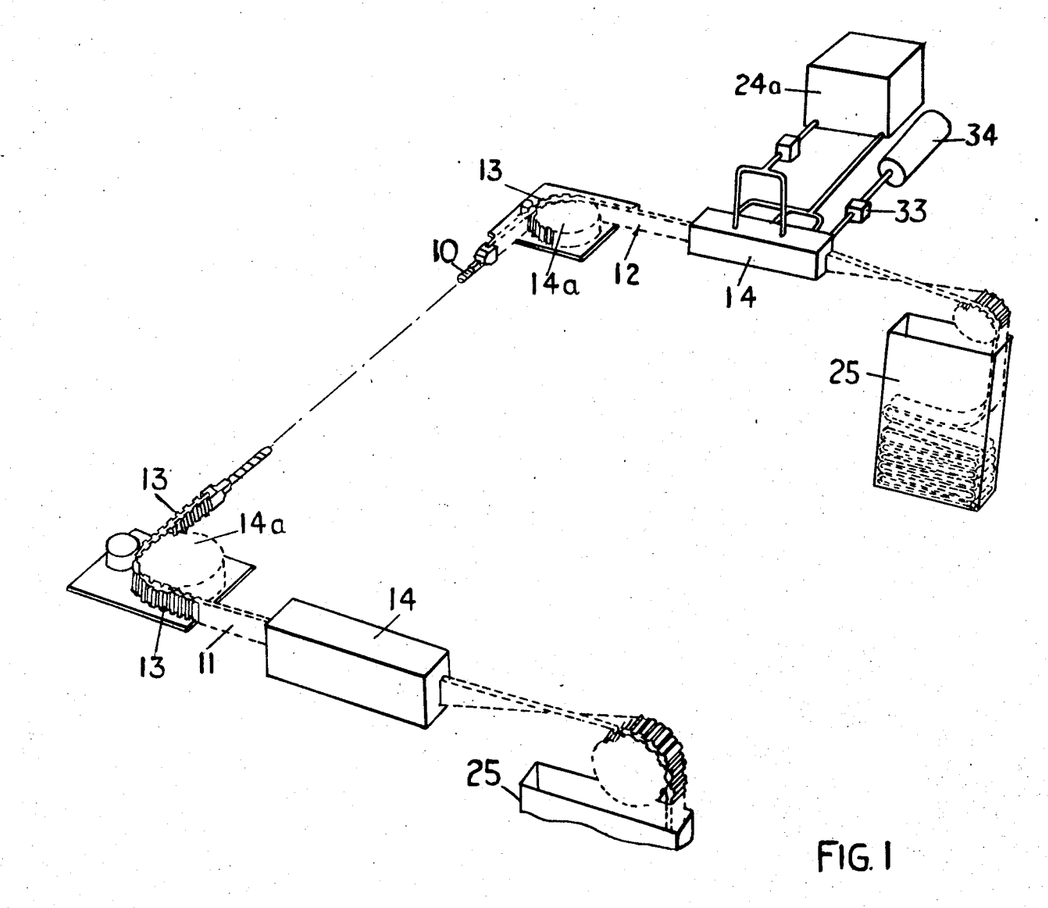
FIG. 1 is a diagrammatic perspective view of one embodiment of the invention.

As shown in FIG. 1 the improved aircraft arresting gear includes a rope or net 10 which is stretched transversely across the runway and which at the ends thereof is connected to belts 11 and 12. Both belts are provided with transversely extending teeth 13 on each face thereof. Each belt passes over a guide pulley 14a and through a pump casing 14 in each of which are pairs of toothed wheels 15 and 16, see FIG. 3, the toothed wheels 15 mating with the teeth 13 on one face of the belt and the toothed wheels 16 mating with the teeth on the other face of the belt. Each casing has inlet ports 17 and outlet or delivery ports 19, there being an inlet port at one side of each toothed wheel and an outlet port at the other side of each toothed wheel. Between each inlet and outlet port the casing is such that the toothed wheels make wiping contact therewith. Thus each toothed wheel with its casing and the belt constitute a gear type pump. There may be any number of such pumps.

Figure 2:
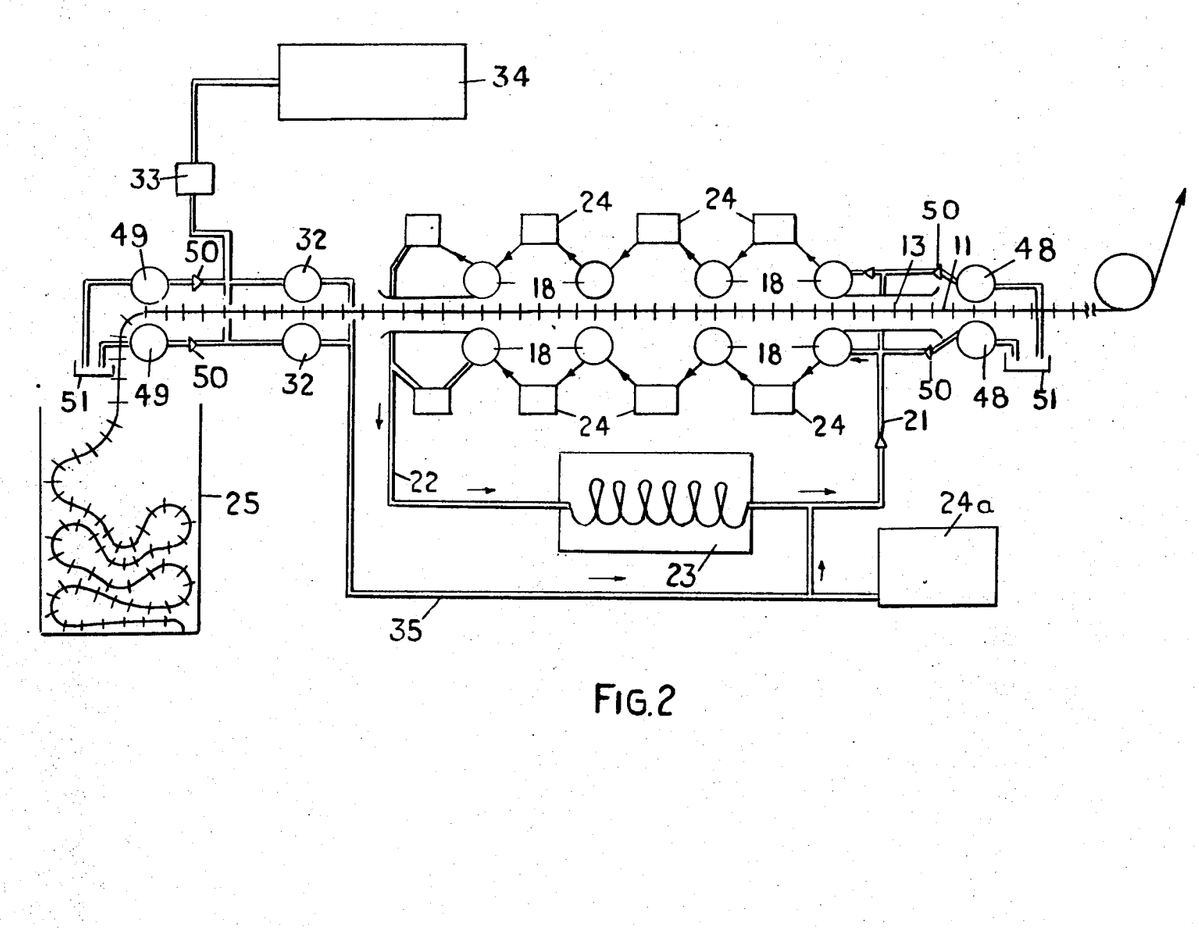
FIG. 2 is a diagrammatic sectional elevation of the power absorbing means.

In the construction shown diagrammatically in FIG. 2 there are four pumps, each designated 18, on each side of the belt, the inlet and outlet ports of opposite pumps being interconnected so that the tendency of difference in pressure in the opposite pumps bending the belt is avoided. The delivery of each pump passes through a control valve 24 by which the delivery pressure and hence the back pressure or retarding force applied to the belt can be regulated.

The pumps may be connected in series and/or in parallel.

The inlet to each series of pumps on opposite sides of the belt is shown connected to inlet pipe 21 see FIG. 2 and the outlet of each series is connected to an outlet pipe 22, the latter being connected through a cooler 23 to the inlet pipe.

It will be seen that each series of pumps of each power absorber has a closed fluid circuit and that part of the circuit together with the cooler is common to the series on both sides of the belt. The common part of the circuit is connected to a make-up tank or reservoir 24a.

Normally the two belts 11 and 12 are in the main stowed concertina-wise in bins 25.

Located between each bin and the first of each series of gear type pumps 18 are further gear type pumps 32 which also function as motors when resetting as later described.

Each pump 32 has ports connected through a common pipe line and a non-return resetting valve 33 with an accumulator 34 and has further ports connected through a pipe line 35 with the make-up tank or reservoir 24a.

Within the casing 14 at one end thereof are sealing rotors 48 and within the casing at the other end thereof are similar sealing rotors 49. Each of said sealing rotors have teeth with which mesh the teeth of the belt passing through the casing.

The sealing rotors are of the same construction as and operate in like manner to the toothed wheels of the pumps and serve to maintain a substantially closed hydraulic circuit by reducing leakage.

Each sealing rotor when rotated in one direction discharges through a non-return valve 50 into the hydraulic system and any leakage past the sealing rotors is discharged into a leakage tank 51. Thus when the belt is drawn to the right as viewed in FIG. 1 the fluid carried in the belt teeth gaps is pumped back to the hydraulic system by the sealing rotors 48 through the non-return valves 50. Any fluid which does leak past the rotor seal is collected in its leakage tank 51. Meantime the return valves at the other end of the casing prevent the pressure fluid passing to the sealing rotors 49.

When the belt is moved to the left the sealing rotors 49 now act in like manner to that of the sealing rotors 48 above described.

When an aircraft lands and engages the rope or net 10 the two belts 11 and 12 are thereby pulled through their pump casings 14. Hydraulic fluid trapped between the teeth of the belt is thereby forced through the outlet ports 19 and through the cooler to be re-cycled through the inlet ports 17. The resistance offered to the fluid being pumped acts as a braking force on the rope to arrest the aircraft. The braking force can be controlled by throttling pumped fluid by means of the valves 24.

When the belts are pulled through the pump casings each is also pulled through the casings of the two pumps 32 each of which draws hydraulic fluid from the tank or reservoir 24a and forces said fluid under pressure past the non-return valve 33 into the accumulator 34 which is thereby charged. After the aircraft has been arrested said resetting valves are opened so that pressure fluid is supplied to the pumps 32 which now function as motors and feed back the belts into the bins so that the gear is now prepared to arrest a further aircraft.

Figures 3, 4:
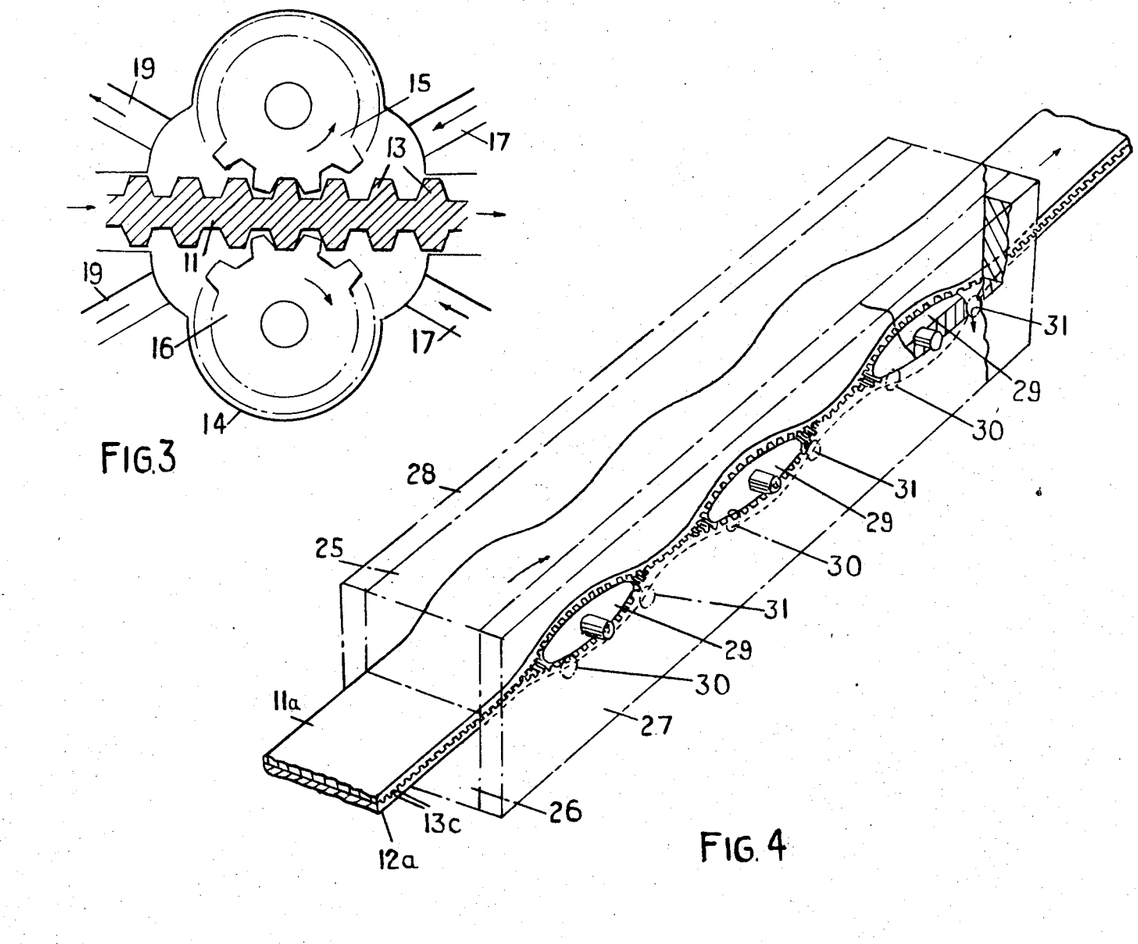
FIG. 3 shows diagrammatically to a larger scale a sectional view of the power absorbing means.
FIG. 4 shows diagrammatically an alternative construction of power absorbing means.

In another embodiment of the invention each end of the rope or net 10 is connected to a pair of belts 11a and 12a having intermeshing transverse teeth 13a, see FIG. 4. Each pair of belts is normally stowed in a bin and is passed through an elongated casing formed by an upper guide bar 25, a lower guide bar 26 and side cover plates 27 and 28, the belts passing between the guide bars. Within the casing is a series of fixed separating blocks 29 each of which is of sinusoidal formation. Near one end of each block is an inlet port 30 and near the other end of each block is an outlet port 31. There are gaps formed between the belts at each end of the separating blocks, alternate gaps being connected to the ports 30 and 31.

These gaps between the guide bars extend from end to end of the casing and are of such dimensions that the superimposed belts 11a and 12a make a sliding fit therein.

The inlet and outlet ports are interconnected with control valves, cooler, etc., as in the previously described embodiment of the invention.

When the superimposed belts are drawn through the casings, which will occur when the rope or net is engaged by the aircraft, hydraulic fluid fed through the inlet ports 30 fills the gaps between the teeth of the belts and is carried thereby over the under the blocks 29. When the teeth again mesh the trapped fluid is forced through the outlet ports 31. Thus the belts, the casing and the separating blocks act like a series of gear pumps and by reason of the resistance offered to the flow of the fluid a braking force is applied to the belts and this in turn decellerates the aircraft.

Figures 5, 6:
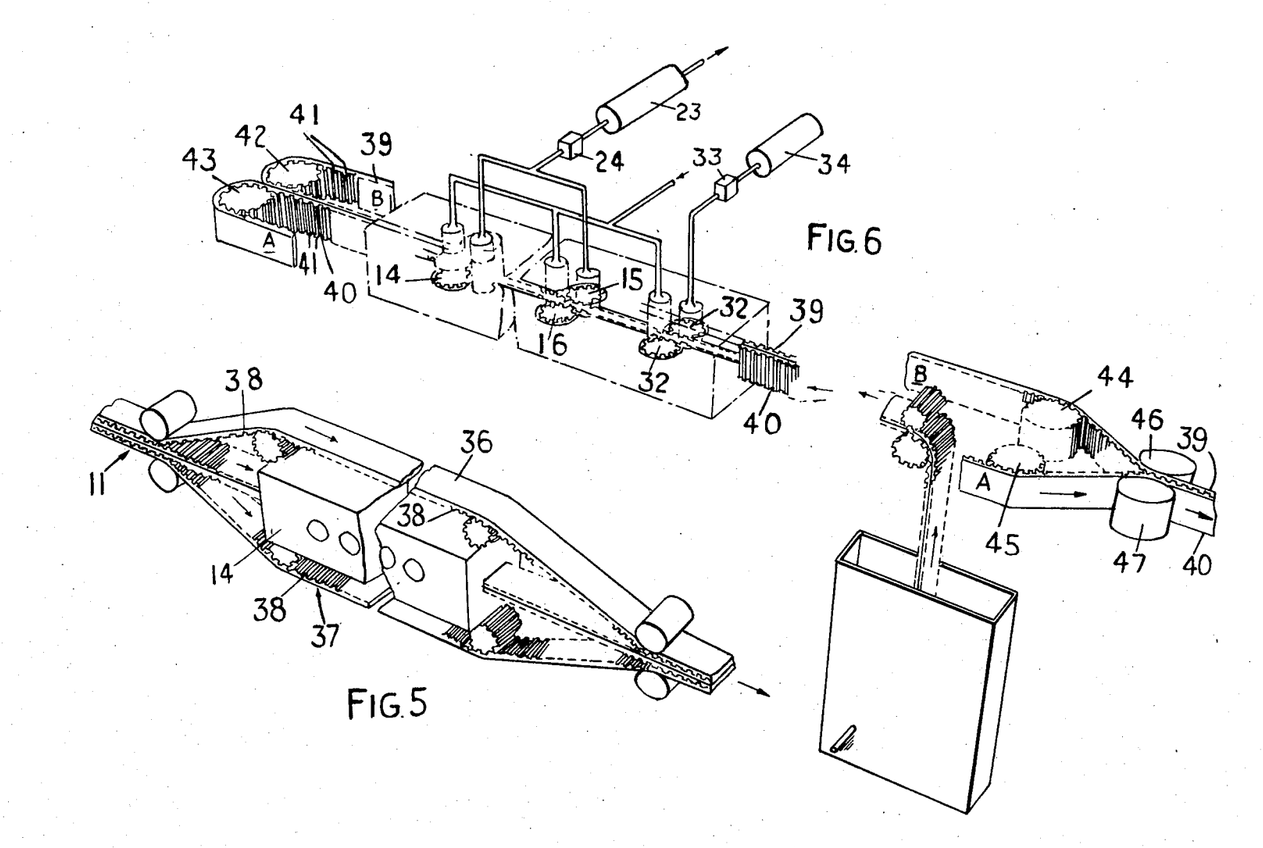
FIG. 5 shows the provision of further belts with transverse teeth to protect the teeth of the belts which mesh with the toothed wheels.
FIG. 6 is a diagrammatic perspective view showing the power absorbing means with composite belt and guiding means therefor.

In FIG. 5 each power absorber of the arresting gear has a belt 11 with transverse teeth on both faces thereof. To protect said teeth two additional belts are provided, said belts, which are designated 36 and 37, have transverse teeth 38 on their opposed faces which mesh with the teeth of the belt 11. That is, the belt 11 is sandwiched between the belts 36 and 37, their teeth intermeshing. Before the belt 11 enters the casing the belts 36 and 37 are separated therefrom, one of the belts 36 being then guided over the pump casing and the other belt 11 is guided below the pump casing.

At the other end of the casing the belts 36 and 37 are guided by rollers so that their teeth again mesh with those of the belt 11. Thus, except where the belt 11 is approaching, passing through and leaving the casing its teeth are protected by the belts 36 and 37 between which it is sandwiched.

Where the belt 11 or 12 has teeth on only one face thereof it will be understood that only one additional belt is required to protect the teeth thereof.

In the arrangement shown in FIG. 6 each belt attached to a rope or net is a composite belt formed of two belts 39 and 40 each having transverse teeth 41 on one face. Where the composite belt is stowed in the bin and where it extends to and through the casing 14 the two belts are back to back with their teeth outwards. The teeth thus mesh with the toothed wheels within the casing as described with reference to FIGS. 1, 2 and 3.

When the composite belt emerges from the casing the two belts 39 and 40 pass around the two guide toothed wheels 42 and 43 to form U loops, then pass over further toothed wheels 44 and 45 and then between guide rollers 46 and 47 by which the teeth of the opposed belts are caused to intermesh to form the composite belt which is attached to one end of the rope or net. Thus the teeth of the composite belt, where it extends from the rollers to the rope or net, are protected.

When the composite belts are retracted each is separated by the toothed wheels 44 and 45 and brought back to back by the toothed wheels 42 and 43 to pass through the casing 14 to be stowed in a bin.

Figure 7:
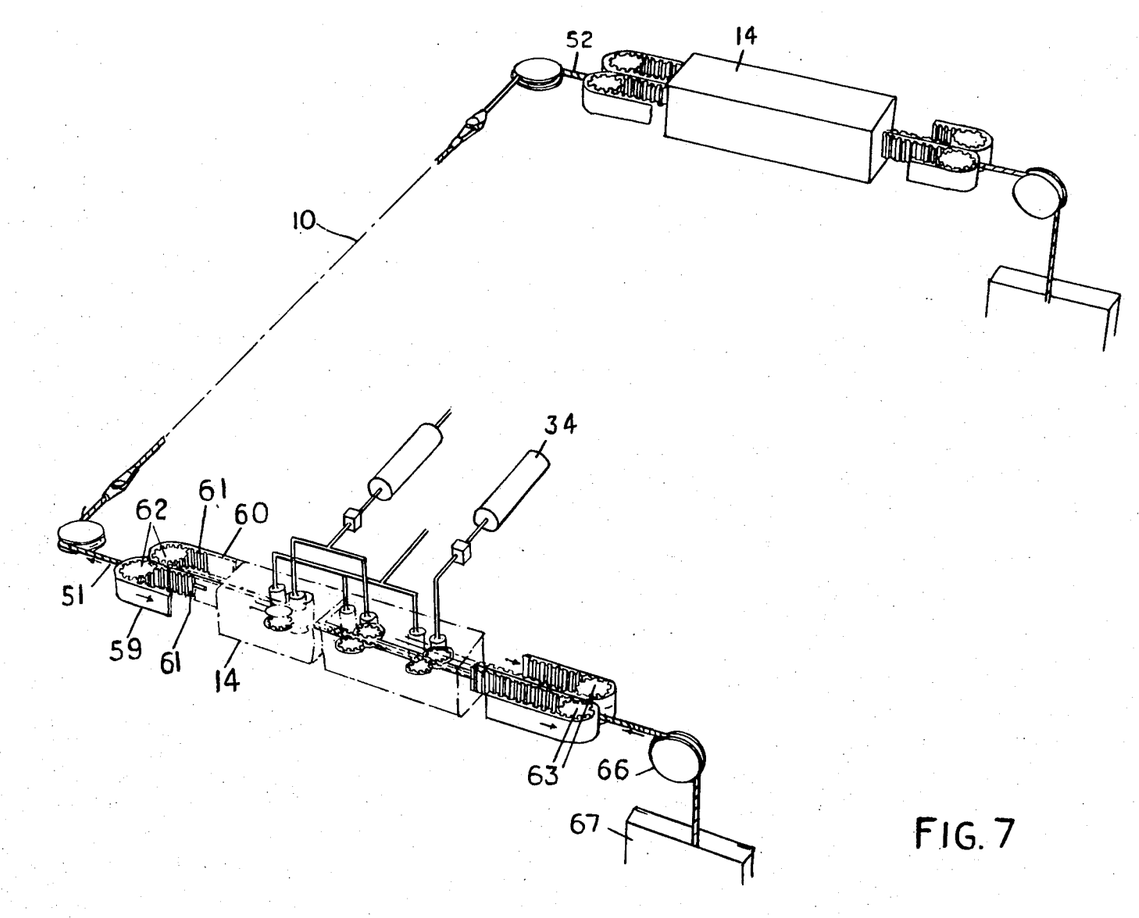
FIG. 7 is a diagrammatic perspective view of a further embodiment of the invention.
Figure 8:
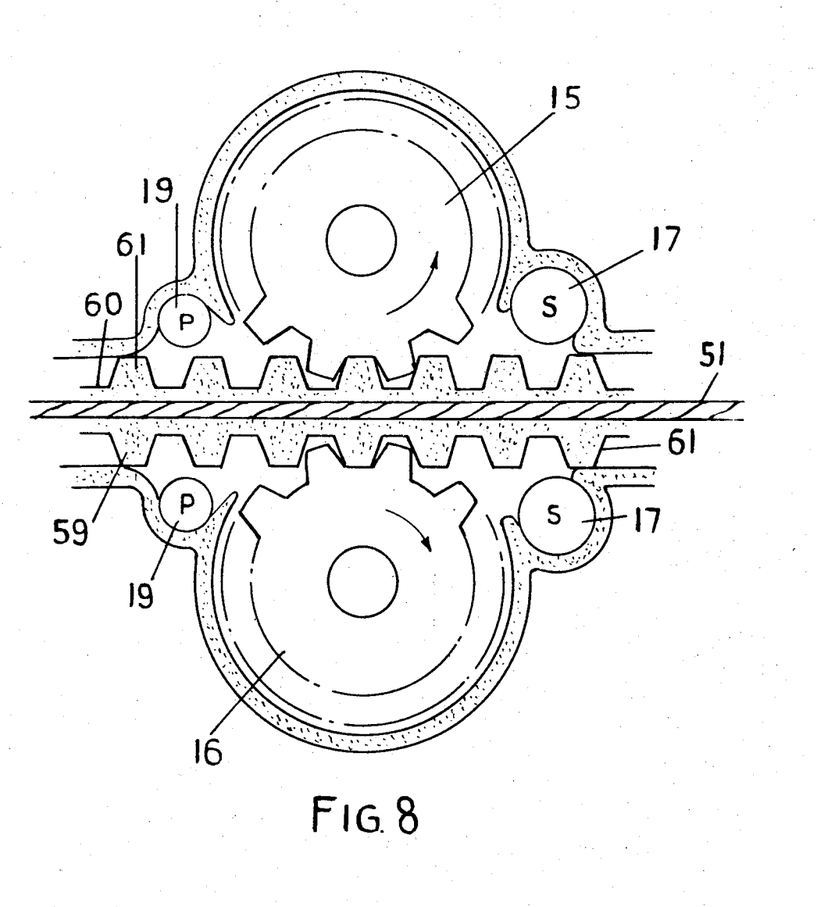
FIG. 8 is a sectional elevation of part of the power absorbing means.

The embodiment of the invention shown in FIGS. 7 and 8 is substantially similar to the embodiment of the invention shown diagrammatically in FIG. 2 and differs therefrom only in the construction of the belts and the means whereby they are drawn through the pump casings. Consequently only such parts of the arresting gear need now be particularly described, the other parts thereof bearing the same reference numerals as the corresponding parts shown in FIG. 2.

The two ends of the rope or net 10 are respectively connected to cables 51 and 52. Associated with each pump casing 14 are two endless belts 59 and 60 each having on its inner face transversely extending teeth 61 and each being passed around rollers 62 and 63 at the ends of the adjacent casing and exterior thereto. The inner runs of the belts 59 and 60 are back to back and pass longitudinally through their associated casing from end to end. The teeth of the belts and the teeth of the gear wheels inter-mesh to form a series of gear type pumps. As previously described the outlet of each pump passes through a control valve by which the delivery pressure can be regulated and hence the retarding force applied to the belts.

The outer faces of the belts are of rubber or other suitable resilient material and sandwiched between the two belts 59 and 60 of one of the power absorbers is the cable 51 and sandwiched between the belts of the other power absorber is the cable 52. Each of said cables passes over a guide pulley 66 to be stowed in a receptacle 67.

It will be appreciated that the cables are frictionally gripped by opposed runs of the endless belts, the grip being due, at least in part to the pressure of the fluid in the high pressure side of each pump, said pressure acting on the belts.

When an aircraft lands on the runway and engages the rope or net the two cables or flexible members drive the endless belts so that hydraulic fluid trapped between their teeth is forced by the teeth of the wheels through the outlets. As the outlets are controlled by valves the pressure of the fluid ejected therethrough can be regulated to give the required retarding force to the travel of the endless belts and therefore to the retarding force exerted by the rope of net on the aircraft.

It will be appreciated that the lengths of the belts are substantially shorter than those provided in the first described embodiment of the invention.

Figure 9:
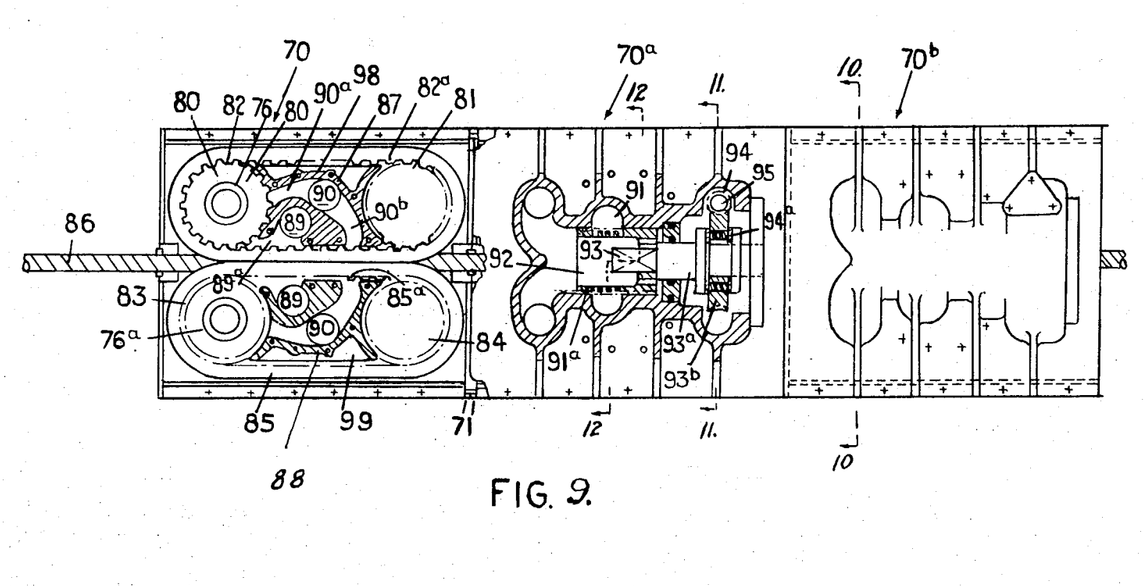
FIG. 9 is a plan view, partly in section, of a further construction of power absorbing means for the aircraft arresting gear.
Figure 10:
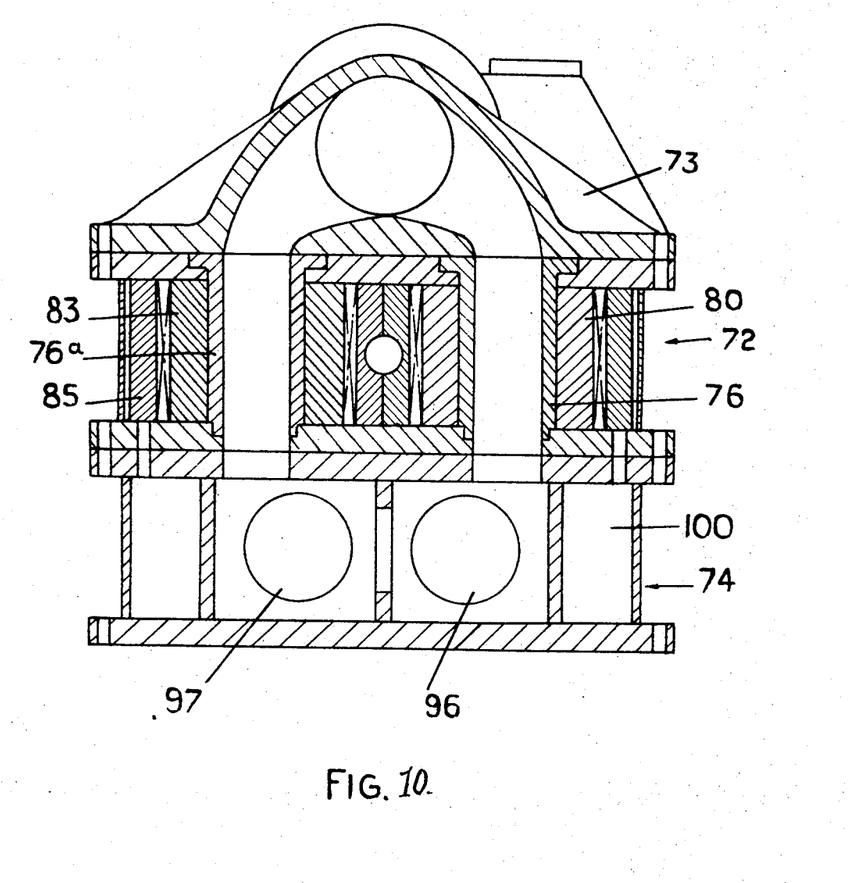
FIGS. 10, 11 and 12 are sections on the lines 10—10, 11—11 and 12—12 respectively of FIG. 9.
Figure 11:
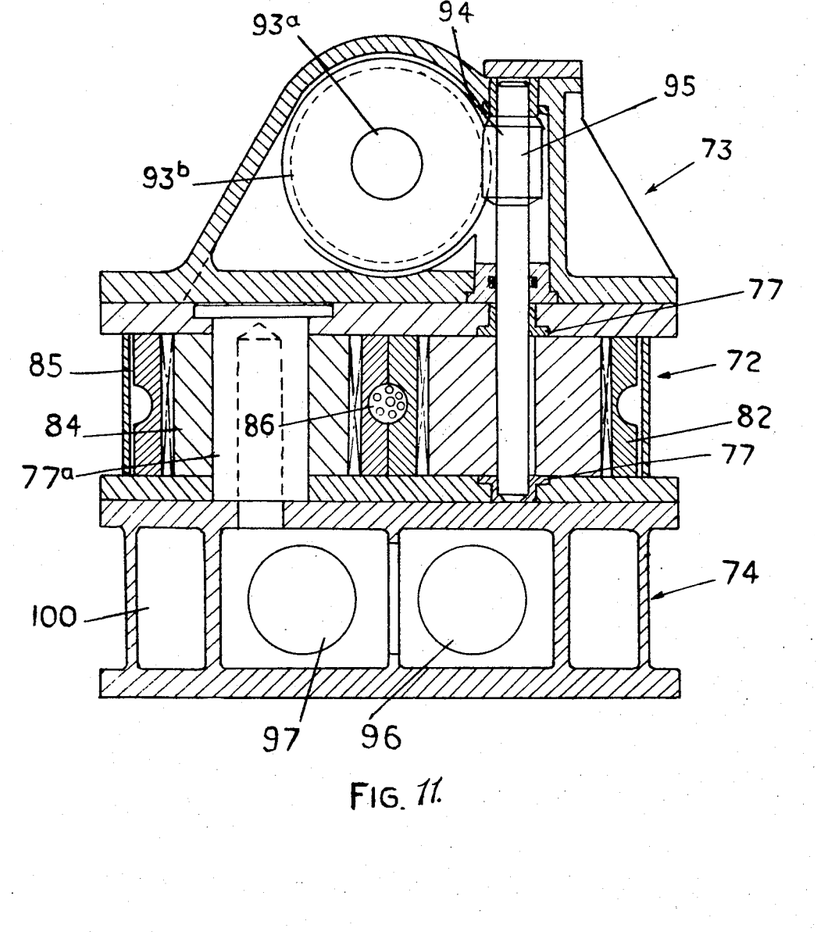
Figure 12:
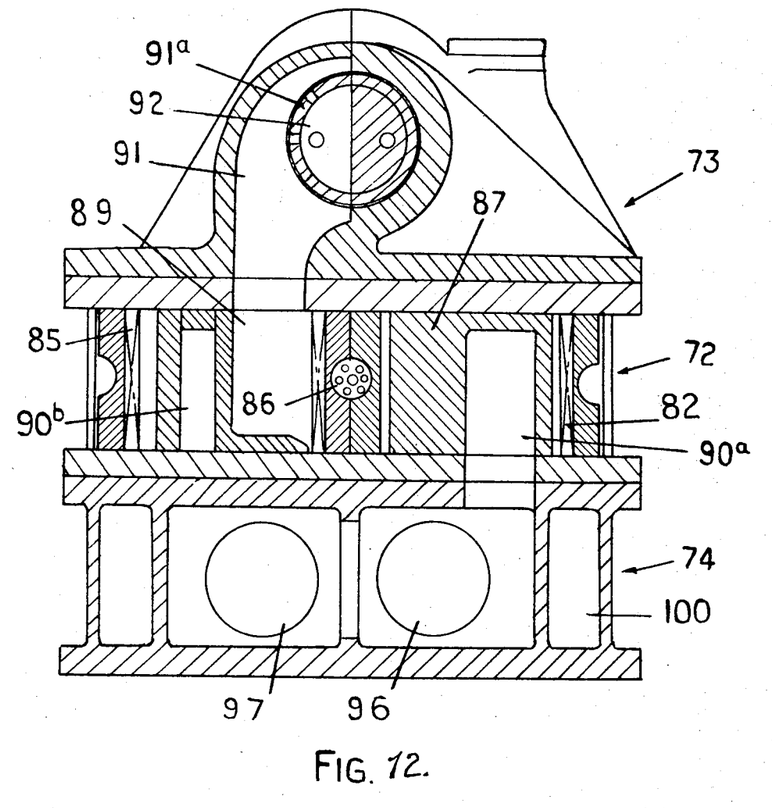

As shown in FIG. 9 the power absorber comprises a series of power absorbing units connected end to end. FIG. 9 shows three units designated 70, 71a and 70b but it will be understood that there may be any number of units. The units have end flanges 71 which are bolted together.

Each unit comprises an inner section 72, an upper section 73 and a lower section 74. In FIG. 9 the inner section 72 of the unit 70 is shown in section and the upper section 73 of the unit 70a is likewise shown in section.

The inner section of each unit has top and bottom side plates between which extend a pair of tubular bearings 76 and 76a and a second pair of bearings 77 and 77a.

On the bearings 76 and 77 are rotatably mounted gear wheels 80 and 81 over which is trained an endless belt 82 having on its inner face transverse ribs or teeth 82a which mesh with the gaps between the teeth of the said gear wheels. On the bearings 76a and 77a are rotatably mounted gear wheels 83 and 84 over which is trained an endless belt 85 likewise having transverse ribs or teeth 85a which mesh with the gap between the teeth of the gear wheels 83 and 84. Between the opposed faces of the two belts of successive units is sandwiched a cable 86 which at one end thereof is attached to one end of the rope or net which spans the runway and at the other end thereof is stowed in a bin.

It will be understood that this power absorber is positioned at one side of the runway and that a second similar power absorber is positioned at the other side of the runway, the cable of the second power absorber being attached to the other end of said rope or net.

Extending between the two gear wheels 80 and 81 is a pump body member 87 which at the ends thereof is of concave formation so that the gear wheels 80 and 81 make wiping contact therewith. Extending between the gear wheels 83 and 84 is a pump body member 88 likewise of concave formation at both ends thereof to make wiping contact with the gear wheels 83 and 84.

Each of said pump body members has a high pressure duct 89 which constitutes an outlet port communicating with a chamber 89a at the inner run of the adjacent belt and adjacent gear wheel and has also a low pressure passage 90 which constitutes an inlet port with branches 90a and 90b the former terminating at the adjacent gear wheel and the latter terminating at the inner run of the adjacent belt near to the gear wheel 81 or 84.

In each upper section 73 is a high pressure valve chamber 91 which is in communication with one end of the high pressure chamber 89, the other end of which is closed and which encircles an axially sliding hollow cylindrical valve member 91a having a multiplicity of perforations. The valve member has an external screw thread at one end thereof which is screwed within a cylindrical low pressure chamber 92. At the other end of said valve member is an opening of square section in which fits a key 93 of similar section, the key forming the end of a spindle 93a on which is a worm wheel 93b which incorporates a torque limiting device 94a such as a slipping clutch. The worm wheel is rotated by means of a worm 94 fast on a spindle 95 the inner end of which is keyed to the gear wheel 81. The valve thus moves in unison with the belts within the limits of its travel. If the belts over travel the valve, the slipping clutch 94a comes into action.

The low pressure chamber 92 communicates with one end of each of the tubular bearings 76 and 76a the other ends of which are in communication with a low pressure fluid chamber 96 and 97 in the lower section 74 of each unit.

The said pump body members 87 and 88 form cavities 98 and 99 closed by the outer runs of the two belts which cavities drain into cavities 100 in the lower section of each unit.

In describing the operation of one of said units it will be assumed that it is fully charged with hydraulic fluid, that an aircraft has alighted on the runway and the cable 86 is drawn therethrough from right to left as viewed in FIG. 9. The cable then drives the two belts 82 and 85 between which it is tightly sandwiched and the belts in turn rotate the gear wheels. The fluid carried around by the two gear wheels 80 and 83 is displaced by the teeth or ribs of the belts 82 and 85 and is forced under pressure into the high pressure chambers 89. Such fluid encounters the valve member and the resistance offered by the valves to the passage of fluid thereto determines the pressure of fluid and therefore the back pressure offered thereby to the travel of the belts and therefore the retarding force applied by the belts to the cable. The greater such force the greater is the retarding force applied to the aircraft.

As the aircraft is being thus retarded the worm and worm-wheel gearing shifts the valve member so that more and more of its perforations are blanked off to increase the retarding effect.

The fluid in the receptacles 98 and 99 fills the gaps between the teeth of the belts and this fluid is maintained under pressure by being displaced by the teeth of the gear wheels.

What I claim is:

1. An arresting gear for arresting the motion of an aircraft landing on a runway comprising aircraft engaging means stretched across the runway, power absorbing means located at each side of the runway, each power absorbing means comprising at least one flexible belt having transversely extending teeth, a casing through which the belt extends and through which the belt is pulled by the aircraft engaging means when an aircraft engages therewith the casing having an inlet port and an outlet port, means by which the hydraulic fluid is fed to the inlet port to fill the gaps between said teeth, means by which the fluid in said gaps is discharged through the outlet port and valve means by which the pressure of the discharged fluid can be controlled so that the back pressure exerted on the flexible belt can be regulated to control the retarding of the aircraft.

2. An arresting gear as claimed in claim 1 wherein each power absorbing means is provided with a toothed gear which meshes with the teeth of the belt passing therethrough to form a pump so that the hydraulic fluid in the gaps between the teeth of the belt is discharged under pressure through the outlet.

3. An arresting gear as claimed in claim 1 wherein each belt has transverse teeth on both faces thereof and the casing through which it passes is provided with two inlet ports, two outlet ports and two toothed wheels, the teeth of one wheel meshing with the gaps between the teeth on one face of the belt and the teeth of the other wheel meshing with the gaps between the teeth on the other face of the belt, the belt and tooth wheels thereby forming two gear type pumps with a casing common to both.

4. An arresting gear as claimed in claim 2 wherein the casing of each power absorbing means has a series of alternate inlet and outlet ports on one side of the belt, a corresponding series of inlet and outlet ports on the other side of the belt and a tooth wheel between each pair of inlet and outlet ports.

5. An arresting gear as claimed in claim 1 wherein each end of the aircraft engaging means is connected to two superimposed belts having intermeshing teeth on their superimposed faces and which extend through the casing, guide means by which the belts during their traverse through each casing are separated and thereafter forced together, the separating of the belts permitting the hydraulic fluid to enter between the belts through the inlet port while the subsequent meashing of the teeth and gaps forces the fluid trapped in the gaps through the outlet port.

6. An arresting gear as claimed in claim 2 wherein each power absorber has an accumulator connected to the outlet port and a non-return resetting valve introduced between each accumulator and outlet port and through which hydraulic fluid is forced by a toothed wheel when the belt is drawn through its casing, the said wheels functioning as motors powered by the accumulators when the valves are reset so that they retract the belt.

7. An arresting gear as claimed in claim 2 wherein the teeth of the belt of each power absorbing means are protected by a protective belt having teeth which mesh with the teeth of the first-mentioned belt, each power absorbing means having guide means which separate the intermeshing belts when passing through its casing and further guide means to thereafter cause the teeth of the belts to intermesh.

8. An arresting gear as claimed in claim 2 wherein the belt of each power absorbing means is a composite belt formed of two belts each having teeth on one face only, the belts being back to back with their teeth outwards when fed to and drawn through the casing and wherein guide means are provided by which the belts forming each composite belt are separated to form two U loops after leaving the casing and further guide means by which the teeth of the two belts forming the composite belt are forced together after passing through the casing.

9. An arresting gear for arresting the motion of an aircraft landing on a runway as claimed in claim 1 wherein each power absorbing means comprises a hydraulic gear type pump casing having inlet and outlet ports, pairs of opposed pump gear wheels rotatably mounted within the casing, two parallel endless belts arranged back to back with their opposed runs extending through the casing and between the opposed gear wheels, the inner faces of the belts having transversely extending teeth which mesh with the pump gear wheels, means by which hydraulic fluid under pressure is supplied to the inlet ports of the casing, valve means by which the pressure of fluid discharged through the outlet ports is controlled and flexible means sandwiched between the opposed runs of the two belts and secured to the means extending across the runway, the arrangement and construction being such that when the means stretched across the runway is engaged by an aircraft the flexible means connected thereto are pulled through the casings and the gear wheels are rotated so that hydraulic fluid carried round by the gear wheels is discharged under pressure by the ribs of the belts, the resistance encountered by the gear wheels due to the controlled pressure of the discharged fluid being transmitted through the belts to the aircraft engaging means which transmits a retarding force to the aircraft.

10. An arresting gear as claimed in claim 9 wherein the outer faces of the endless belts are of resilient material.

11. An arresting gear as claimed in claim 9 wherein each power absorbing means is formed of a series of units each of which is formed of three sections, namely an inner section carrying pairs of rollers over which the endless belts are trained, a second section having valve means actuated by the belts and by which the retarding force of the fluid discharged by gear wheels is controlled, and a third section providing part of the hydraulic flow system by which fluid is supplied to the gear wheels.

12. An arresting gear as claimed in claim 9 wherein the belts are formed of resilient material and wherein high pressure fluid acts on the belts to ensure that the flexible members are tightly sandwiched between the opposed runs of the belts.

* * * * *